United States Patent
Matolia et al.

(10) Patent No.: US 11,765,680 B2
(45) Date of Patent: Sep. 19, 2023

(54) DATA ANALYTICS FOR MULTI-ACCESS EDGE COMPUTATION

(71) Applicant: Apple Inc., Cupertino, CA (US)

(72) Inventors: Rohit R. Matolia, Surat (IN); Alosious Pradeep Prabhakar, Singapore (SG); Krisztian Kiss, Hayward, CA (US); Mohammed Sadique, Parramatta (AU); Srinivsan Nimmala, San Jose, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 17/219,490

(22) Filed: Mar. 31, 2021

(65) Prior Publication Data

US 2021/0314906 A1 Oct. 7, 2021

(30) Foreign Application Priority Data

Apr. 3, 2020 (IN) .............................. 202041014954

(51) Int. Cl.
*H04W 64/00* (2009.01)
*H04W 8/02* (2009.01)
*H04W 84/02* (2009.01)

(52) U.S. Cl.
CPC ........... *H04W 64/003* (2013.01); *H04W 8/02* (2013.01); *H04W 64/006* (2013.01); *H04W 84/02* (2013.01)

(58) Field of Classification Search
CPC ... H04W 64/003; H04W 8/02; H04W 64/006; H04W 84/02; H04W 8/186; H04W 8/24; H04W 24/04; H04W 24/10; H04W 36/0083; H04W 36/22; H04W 36/30

USPC ............................................... 455/456.1–457
See application file for complete search history.

(56) References Cited

U.S. PATENT DOCUMENTS

| | | |
|---|---|---|
| 2018/0352050 A1 | 12/2018 | Li |
| 2019/0387448 A1 | 12/2019 | Stauffer |
| 2021/0014141 A1* | 1/2021 | Patil .................... H04L 41/5009 |
| 2021/0084525 A1* | 3/2021 | Takano .................. H04W 4/06 |
| 2021/0144629 A1* | 5/2021 | Wang .................... H04W 88/14 |
| 2022/0070702 A1* | 3/2022 | Puente ................. H04W 8/186 |
| 2022/0086719 A1* | 3/2022 | Devlic .................. H04W 36/22 |

OTHER PUBLICATIONS

First Examination Report for IN Patent Application No. 202041014954; dated Jul. 28, 2023.

* cited by examiner

*Primary Examiner* — Michael Y Mapa
(74) *Attorney, Agent, or Firm* — Kowert, Hood, Munyon, Rankin & Goetzel, P.C.

(57) ABSTRACT

Computer systems and methods are described for operating a network data and analytics function (NWDAF) in a cellular core network. The NWDAF receives user equipment (UE) mobility information from a first network function of the cellular network system and receives edge application server (EAS) information from a second network function of the cellular network system. The NWDAF derives data analytics based at least in part on the UE mobility information and the edge application server information. The NWDAF receives a request for the data analytics from a third network function in the cellular network system, and provides the data analytics to the third network function.

20 Claims, 18 Drawing Sheets

Input Collected from AMF – Related to UE Mobility

| Information | Source | Description |
|---|---|---|
| UE/Group ID | AMF | UE Group IDs |
| UE Locations (1..max) | AMF | UE Positions |
| > UE Location | AMF | TA or cells the the UE enters |
| > Timestamp | AMF | A timestamp when the AMF detects the UE enters this location |
| Type Allocation Code (TAC) | AMF | To indicate the terminal model and vendor information of the UE. The Ues with the same TAC may have similar mobility behavior. The UE whose mobility behavior is unlike other Ues with the same TAC may be an abnormal one. |
| Frequent Mobility Re-registration | AMF | A UE (e.g. a stationary UE) may re-select between neighbor cells due to radio coverage fluctuations. This may lead to multiple re-registrations if the cells belong to different registration areas. The number of re-registrations N within a period M may be an indication for abnormal ping-pong behavior, where N and M are operator's configurable parameters. |

FIG. 13

Input Collected from AF -- Related to edge Application

| Information | Source | Description |
|---|---|---|
| UE ID | AF | GPSI oe external UE ID |
| Application IDs | AF | Identifying Edge application providing this sevice |
| Trajectory | AF | Edge Relocations |
| > UE Location | AF | Tracking/Location Area Mapping to edge Service Area |
| > Timestamp | AF | A time stamp when UE enters this edge Service Area |
| > UE Group Application Session ID | AF | UE group Application ID served by respective EAS |

FIG. 14

EAS Statistics

| Information | Source | Description |
|---|---|---|
| List of Resource Status (1..n) | AF | List of observed load information for each EAS instance along with the corresponding EAS id / EAS |
| > EAS Type | AF | Type of the EAS instance |
| > EAS Instance ID | AF | Identification of the EAS instance |
| > EAS Status | AF | The availability status of the EAS on the Analytics target period, expressed as a percentage of time per status value (registered, suspended, undiscoverable) |
| > EAS Resource Usage | AF | The average load of the EAS instance over the Analytics target period |
| > EAS Load | AF | The maximum load of the EAS instance over the Analytics target period |
| > EAS Measurements | AF | RTT & other information related to measurements |
| > EAS Capability | AF | Capability of EAS processor, GPU, memory, etc. |

FIG. 15

Input Collected from UPF(s) – Related to Edge Application

| Information | Source | Description |
|---|---|---|
| UE ID | UPF | GPSI or external UE ID |
| Application IDs | UPF | Identifying edge application providing this service |
| Trajectory | UPF | Edge relocations |
| > UE Location | UPF | Tracking/Locations area mapping to Edge Service Area |
| > Timestamp | UPF | A time stamp when UE enters this Edge Service Area |
| > UE Group Application Session ID | UPF | UE group Application ID served by respective EAS, can be IP group |
| QoS Flow Bit Rate | UPF | The observed bit rate for UL direction; and the observed bit rate for DL direction |
| QoS Flow Packet Delay | UPF | The observed Packet delay for UL direction; and the observed Packet delay for DL direction |
| Packet Transmission | UPF | The observed number of packet transmission |
| Packet Retransmission | UPF | The observed number of packet transmission |

FIG. 16

EAS Predictions

| Information | Target Node | Description |
|---|---|---|
| Resource Status | NF | List of predicted information for each EAS instance along with the corresponding EAS id / EAS Set ID with respect to UE groups served per application |
| > EAS Resource Relocation | NF | Relocation of assigned resources (CPU, memory, disk) for EAS application to respective UE groups |
| > EAS Load Distribution | NF | The average load of the EAS instance over the analytics target period for different application aspects |
| > EAS TAC Mapping | NF | Mapping of EAS area against mobility area for UE |
| > EAS Applications' State | NF | State of application's run on different EAS with respect to UE groups |
| > Confidence | NF | Confidence of this prediction |

FIG. 17

EAS Predictions

| Information | Target Node | Description |
|---|---|---|
| Resource Update | NF | List of predicted information for each EAS instance along with the corresponding EAS id / EAS Set ID with respect to UE groups served per application |
| > EAS Resource Management | NF | Based upon Analytics model, prediction for whether resource for particular EAS need to be incremented or reduced / optimization |
| > UE Group Mobility | NF | Predicting the UE group mobility on basis of subscription data model & congestion period predictions |
| > Application State & Load | NF | Application state and load predistion on basis of time of usage and number of users at particular instance |
| > Confidence | NF | Confidence of this prediction |

FIG. 18

DATA ANALYTICS FOR MULTI-ACCESS EDGE COMPUTATION

PRIORITY DATA

This application claims benefit of priority to Indian Application No. 202041014954, titled "Data Analytics for Multi-access Edge Computation", filed Apr. 3, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless devices, and more particularly to a system and method for using analytics to provide enhanced edge computing.

DESCRIPTION OF THE RELATED ART

Wireless communication systems have rapidly grown in usage. In recent years, wireless devices such as smart phones and tablet computers have become increasingly sophisticated. Mobile devices (i.e., user equipment devices or UEs) support telephone calls as well as provide access to the Internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

One recent development in cellular network systems is the use of network data analytics. For example, network data analytics has been proposed in 5G networks to use data in the core network to improve network operations. However, improvements in the field are desired.

SUMMARY OF THE INVENTION

Embodiments are presented herein of apparatuses, systems, and methods for a device, such as a network data and analytics function (NWDAF) in a cellular core network, to perform and provide data analytics in an edge computing environment.

In some embodiments, the NWDAF receives user equipment (UE) mobility information from a first network function of the cellular network system and receives edge application server (EAS) information from a second network function of the cellular network system. The UE mobility information may include frequent mobility reregistration information. The EAS information may include one or more of a UE group application identifier of a UE group application served by a first EAS, one or more round-trip-time measurements for an EAS session, or computational capability information of one or more EASs.

In some embodiments, the NWDAF derives data analytics based at least in part on the UE mobility information and the edge application server information. The data analytics may include one or more of suggested relocations of EAS resources to respective UE groups, computational load information for one or more applications served by an EAS, mapping of an EAS area to a mobility area for one or more UEs, or state information for the one or more applications served by the EAS. In some embodiments, the data analytics may include one or more of a prediction for whether EAS resource requirements for one or more applications served by an EAS will increase or decrease, a prediction of UE group mobility, a prediction of a future application state of the one or more applications, or a prediction of a future application load of the one or more applications.

In some embodiments, the NWDAF receives a request for the data analytics from a third network function in the cellular network system, and provides the data analytics to the third network function. The third network function may be a policy control function, a session management function, or an application function. The data analytics may be useable by the third network function to control allocation and relocation of EAS resources to one or more edge applications.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

FIG. 13 is a table illustrating example information related to user equipment (UE) mobility, according to some embodiments;

FIG. 14 is a table illustrating example information collected from an AF related to edge applications, according to some embodiments;

FIG. 15 is a table illustrating example information related to EAS statistics, according to some embodiments;

FIG. 16 is a table illustrating example information collected from a UPF related to edge applications, according to some embodiments;

FIG. 17 is a table illustrating example data analytics computed by a NWDAF, according to some embodiments;

FIG. 18 is a table illustrating example predictive data analytics computed by a NWDAF, according to some embodiments.

Figure 1:
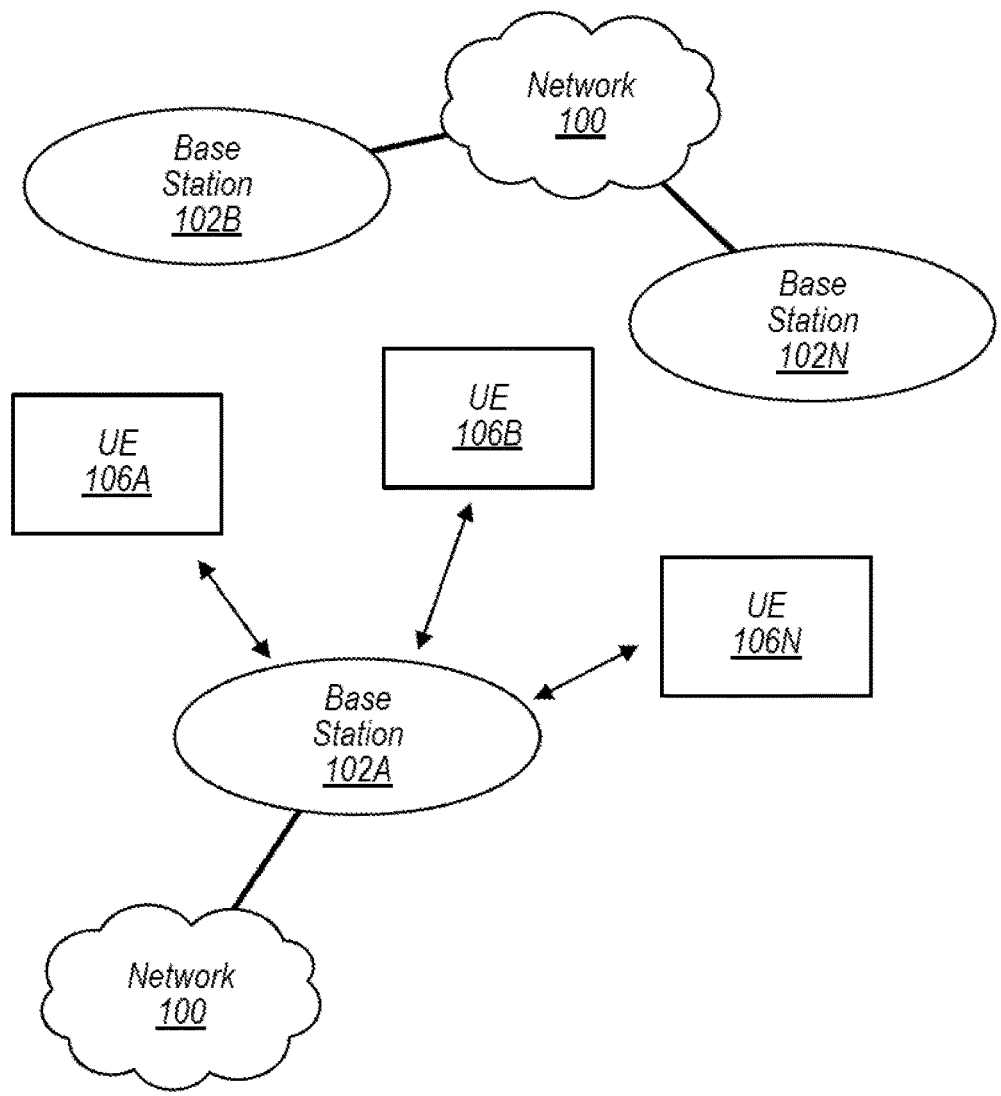
FIG. 1 illustrates an example (and simplified) wireless communication system according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

Various acronyms are used throughout the present disclosure. Definitions of the most prominently used acronyms that may appear throughout the present disclosure are provided below:

UE: User Equipment
RF: Radio Frequency
BS: Base Station
DL: Downlink
UL: Uplink
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
eNA: Enhanced Network Automation
NWDAF: Network Data Analytics Function
IE: Information Element
NF: Network Function
AMF: Access and Mobility Management Function
SMF: Session Management Function
UPF: User Plane Function
PCF: Policy Control Function
AF: Application Function
NEF: Network Exposure Function
NSSF: Network Slice Selection Function
UCMF: UE radio Capability Management Function
URSP: User Route Selection Policies
RFSP: RAT Frequency Selection Priority
OAM: Operation, Administration and Maintenance
OTT: Over the Top
RACS: Radio Capability Signaling
TA: Tracking Area
SUPI: Subscription Permanent Identifier
PUSCH: Physical Uplink Shared Channel
PDCCH: Physical Downlink Control Channel
UP: User Plane
EAS: Edge Application Server
ESA: EAS Serving Area
DN: Data Network

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, unmanned aerial vehicles (UAVs), unmanned aerial controllers (UACs), vehicles, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
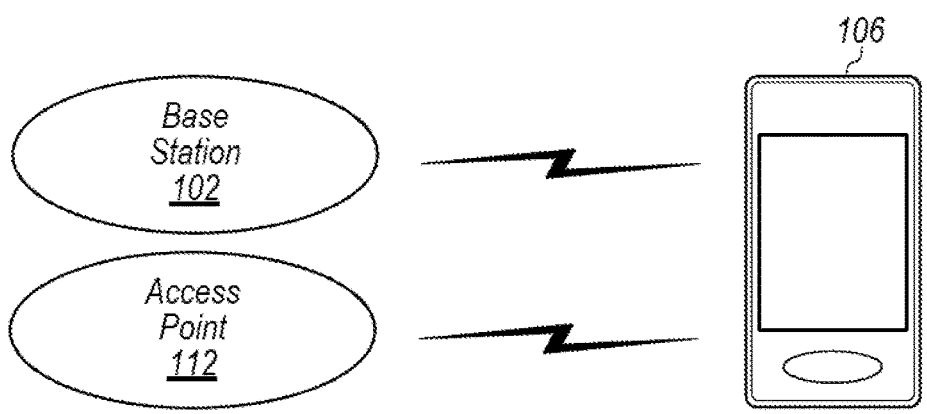
FIG. 2 illustrates an example of a base station (BS) and an access point in communication with a user equipment (UE) device according to some embodiments.

FIGS. 1 and 2—Example Communication System

FIG. 1 illustrates a simplified example wireless communication system in which aspects of this disclosure may be implemented, according to some embodiments. It is noted that the system of FIG. 1 is merely one example of a possible system, and embodiments may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices. The UE devices are examples of wireless devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'.

The communication area (or coverage area) of the base station may be referred to as a "cell." The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. In particular, the cellular base station 102A may provide UEs 106 with various telecommunication capabilities, such as voice, SMS and/or data services.

As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment (UE) 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device as defined above.

The UE 106 may include a processor (processing element) that is configured to execute program instructions stored in memory. The UE 106 may perform any of the embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the embodiments described herein, or any portion of any of the embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
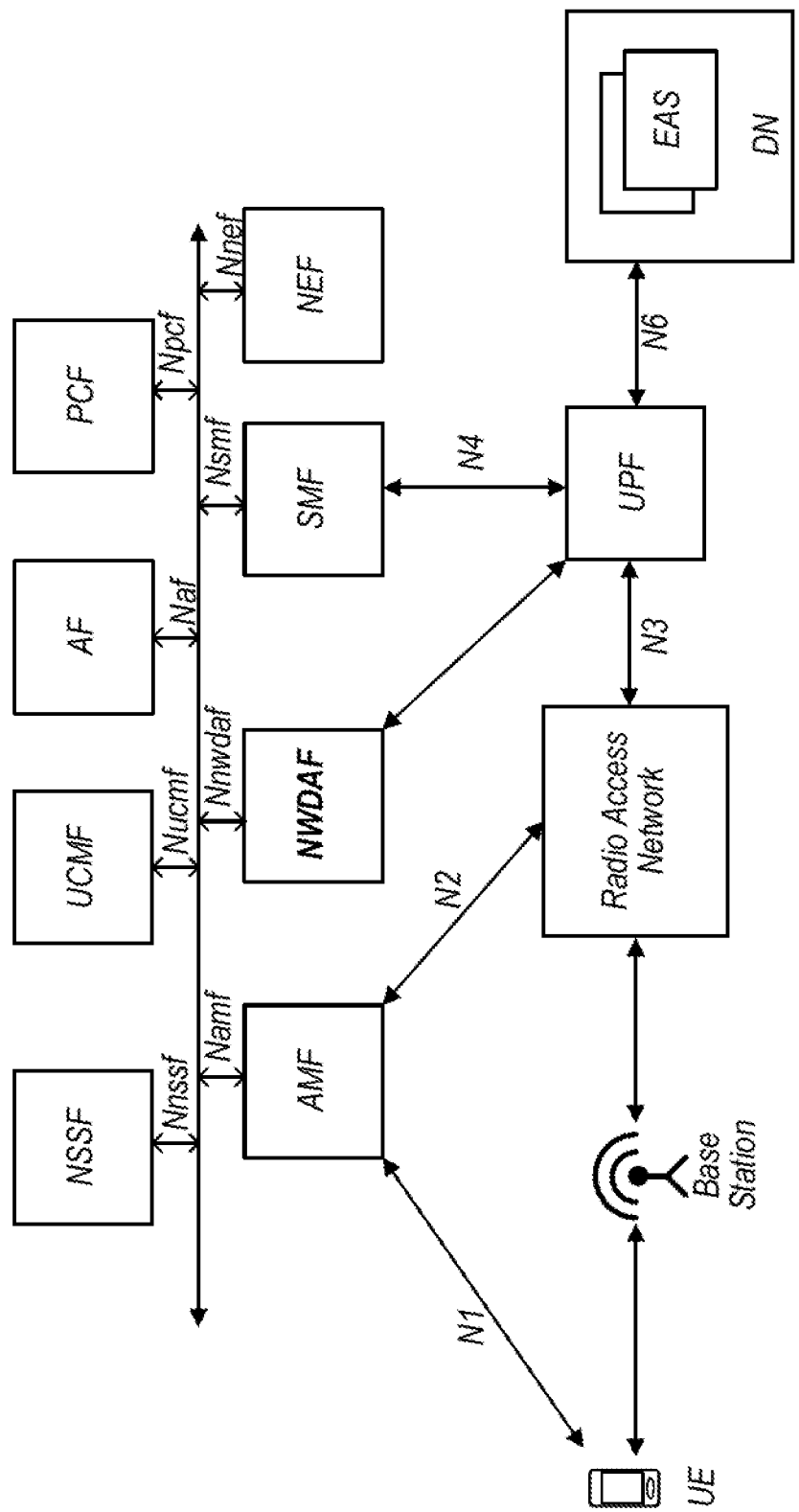
FIG. 3 is a block diagram of a cellular network system including a plurality of network functions, according to some embodiments.

FIG. 3—Example Cellular Network

FIG. 3 is a block diagram illustrating an example cellular network, according to some embodiments. As shown, the UE communicates in a wireless fashion with a base station, which may as one example be referred to as gNB. The base station in turn communicates to a cellular network.

FIG. 3 illustrates a simplified view of a cellular network, showing various elements which may be relevant to operations described herein. As shown, the base station couples to a Radio Access Network (RAN). The RAN may in turn couple to various network elements, including one or more computer systems which implement various network functions. For example, the Radio Access Network may couple to a User Plane Function (UPF) and/or an Access and Mobility Management Function (AMF), which in turn may be coupled to various additional network functions.

As used herein, the term "network function" has the full extent of its ordinary meaning, and at least includes a device, e.g., a combination of hardware and/or software, which performs a function in a network system. Typically, network functions may be implemented as software executing on a computer system, such as a server, e.g., a cloud server.

Network functions which may be present in the cellular network system may include functions such as an Access and Mobility Management Function (AMF), a Policy Control Function (PCF), a Network Data Analytics Function (NWDAF), an Application Function (AF), a Network Slice Selection Function (NSSF), one or more Edge Application Servers (EASs), and a UE radio Capability Management Function (UCMF), among numerous possible others.

As shown, in some embodiments the NWDAF may operate to collect information (analytics) related to operation of UEs and/or EASs within the cellular network. As used herein, the term "analytics" has the full extent of its ordinary meaning, and at least includes information collected by a device which may be useable in changing operation of a system or other devices. This collection of information by the NWDAF is shown symbolically in FIG. 7 by the dashed arrow on the left of the figure. In actual implementation, UE mobility information may be provided to the Radio Access Network (RAN) via a base station, and this information may be provided by the AMF to the NWDAF. Alternatively, or in addition, the RAN, or one or more network elements, may collect information regarding UE mobility or operation and provide this to the NWDAF. As described further below, the NWDAF may receive this UE mobility information as well as EAS information, application information, and/or traffic usage information. The NWDAF may compile and/or analyze this information and provide selective portions of the resultant data analytics to other network elements, so that these other network elements may make more intelligent decisions regarding operation of the network related to user plane improvements for edge computing.

Figure 4:
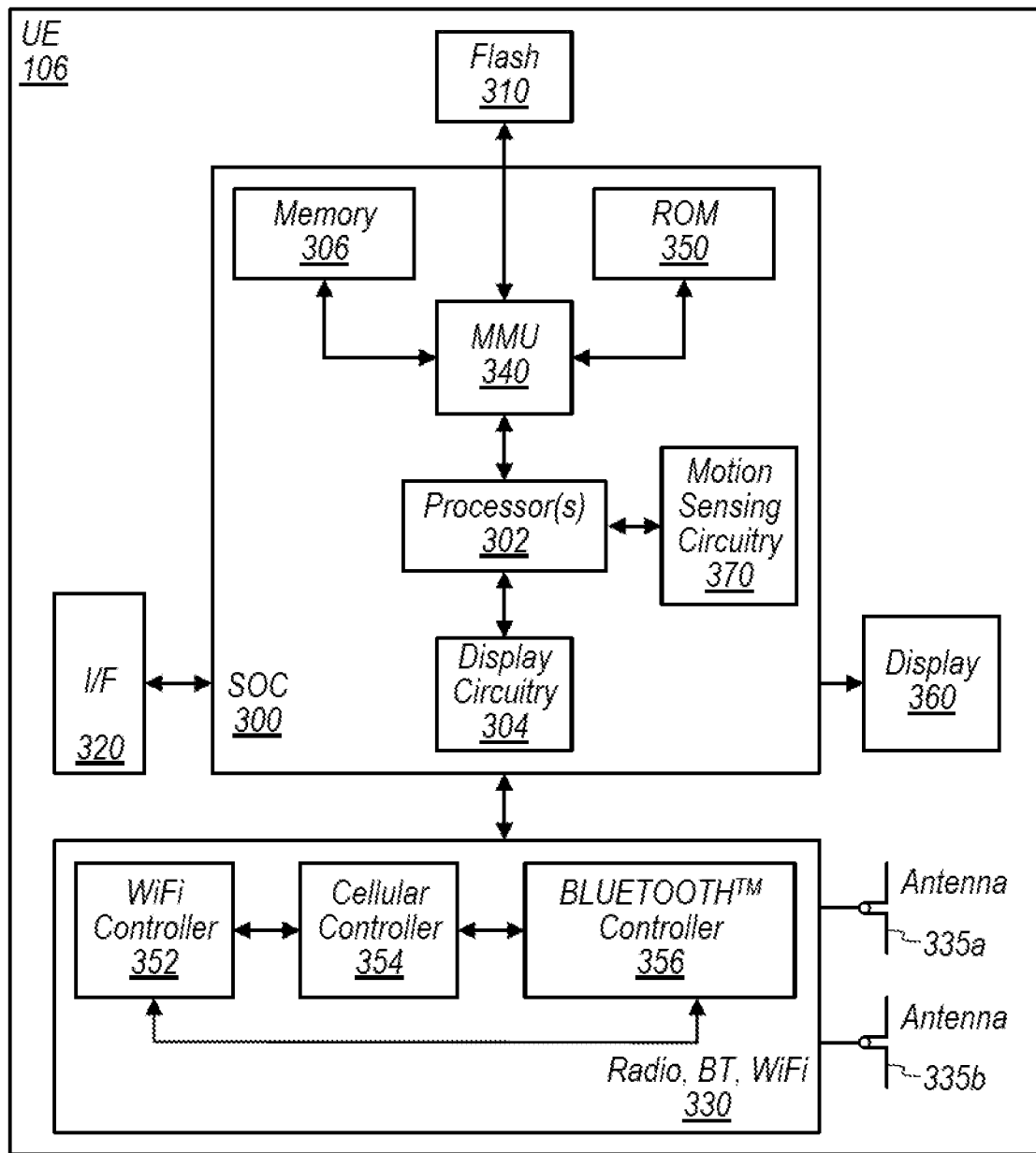
FIG. 4 illustrates an example block diagram of a UE, according to one embodiment.

FIG. 4—Block Diagram of an Example UE Device

FIG. 4 illustrates a block diagram of an example UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, 5G NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform concurrent generation of multiple codebooks for CSI reporting such as described further subsequently herein. The processor(s) 302 of the UE device 106 may be configured to implement part or all of the methods or operations described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 4, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Figure 5:
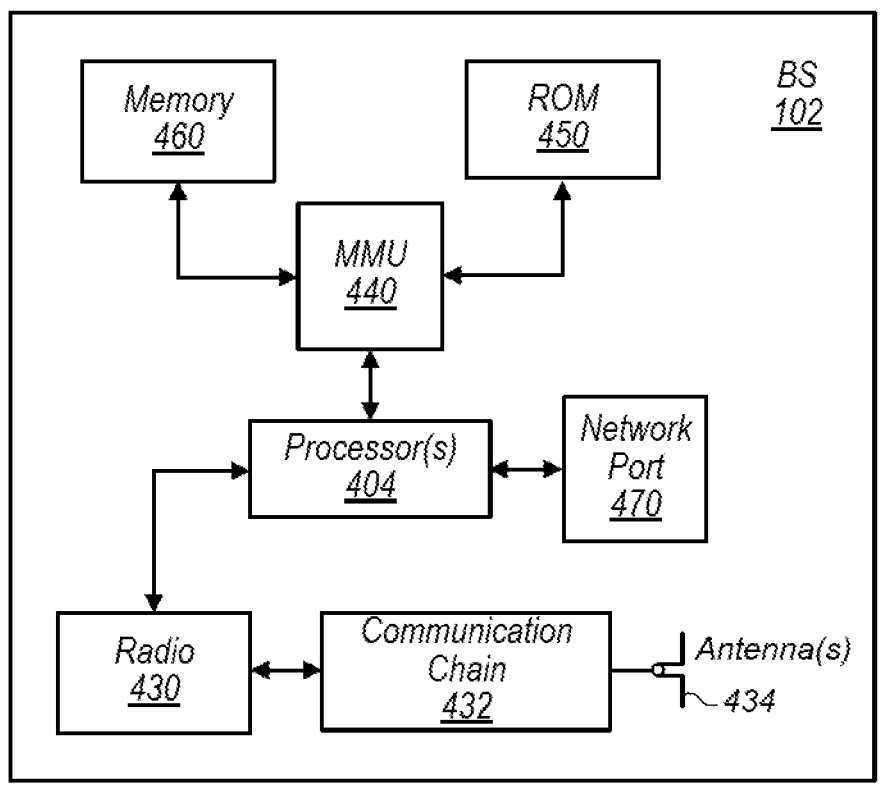
FIG. 5 illustrates an example block diagram of a base station, according to one embodiment.

FIG. 5—Block Diagram of an Example Base Station

FIG. 5 illustrates a block diagram of an example base station 102, according to some embodiments. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 6:
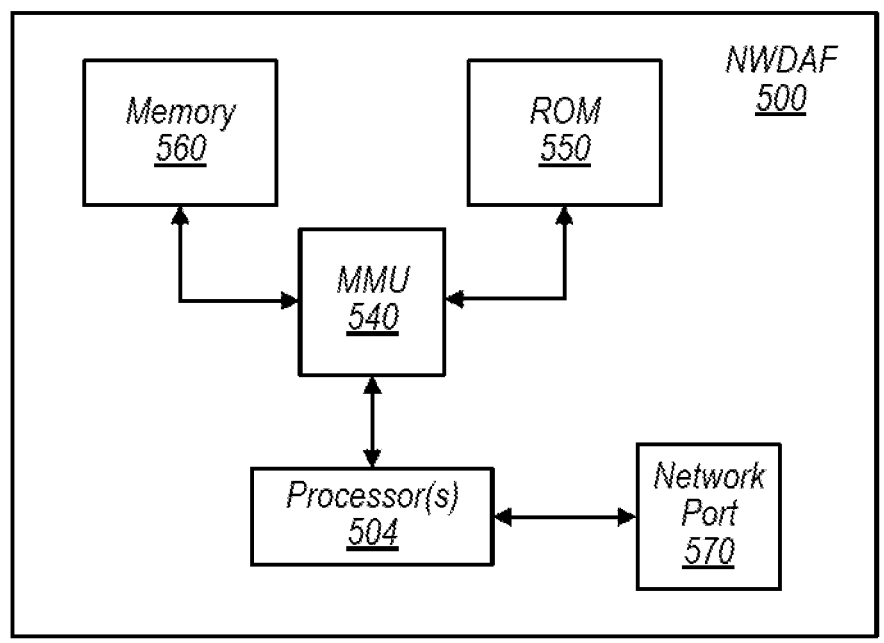
FIG. 6 illustrates an example block diagram of a server (or network element), e.g., which may host a network data analytics function (NWDAF), according to some embodiments.

FIG. 6—Example Block Diagram of a Network Element

FIG. 6 illustrates an example block diagram of a computer system or network element 500, according to some embodiments. According to some embodiments, the network element 500 may implement one or more logical functions/entities of a cellular core network, such as a Network Data Analytics Function (NWDAF), or any of the network functions shown in FIG. 3, or any network function present in a 5G or more advanced network. It is noted that the network element 500 of FIG. 6 is merely one example of a possible network element 500.

As shown, the core network element 500 may include processor(s) 504 which may execute program instructions for the core network element 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The network element 500 may include at least one network port 570. The network port 570 may be configured to couple to one or more network functions and/or devices. The network element 500 may communicate with network functions (e.g., AF, SMF, SMF, UPF, etc.) and/or other network entities/devices by means of any of various communication protocols and/or interfaces.

As described further subsequently herein, the network element 500 may include hardware and software components for implementing and/or supporting implementation of features described herein. The processor(s) 504 of the core network element 500 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof. For example, the network element 500 may implement the EAS and UE mobility data analytics described herein.

The block diagram of FIG. 6 may also be representative of a server computer (possibly located outside of the cellular network) that may implement a portion or all of the operations described herein.

Network Data Analytics

Modern cellular networks are being asked to serve an increasingly diverse array of devices and applications. For example, modern cellular networks may serve traditional UE devices, such as phones or tablets, and may also serve various other wireless devices, such as may be present in an Internet of Things (IoT) system.

Embodiments of the cellular network described herein may include a network data analytics capability, referred to as the Network Data Analytics Function (NWDAF), e.g., as shown in FIG. 3. The NWDAF may operate to collect various information in the cellular network, such as load levels of network slices, UE mobility information, EAS information, network load reports, as well as other types of network information. In embodiments described herein, the NWDAF may also collect information related to each of one or more (e.g., each of a plurality of) UEs that are in wireless communication with the network system. The NWDAF may then make this information available to other network elements as mentioned above. Thus, other network elements may access analytic information from the NWDAF, including UE mobility information and EAS information as described herein, and use this information in making more informed (or more intelligent) decisions regarding operation of the network.

Future cellular network architectures are evolving to support the greater and more diverse numbers of UEs that may desire to use the network. For example, future cellular networks may have an increased density of base station deployment and may also support different, heterogeneous access networks, such as cellular networks operating at different frequencies as well as Wi-Fi networks, etc. It may also be desirable for modern cellular networks to provide efficient deployment and integration mechanisms for these heterogeneous access networks, as well as support of flexible and dynamic steering of UE sessions though these access networks. As a result, modern cellular networks provide a fairly complex heterogeneous environment. Consequently, network selection of the most appropriate RAT to support a user's session is also a difficult task.

In some embodiments, the NWDAF may collect or receive information that is useable in performing more intelligent RAT (Radio Access Technology) and/or frequency selection. Alternatively or additionally, the NWDAF may collect or receive information that is useable for more efficiently allocating edge computing resources.

Embodiments are described herein in the context of cellular systems (e.g., 3GPP-based systems). However, the embodiments described herein may be readily extended to non-cellular (non-3GPP-based) systems.

Figure 7:
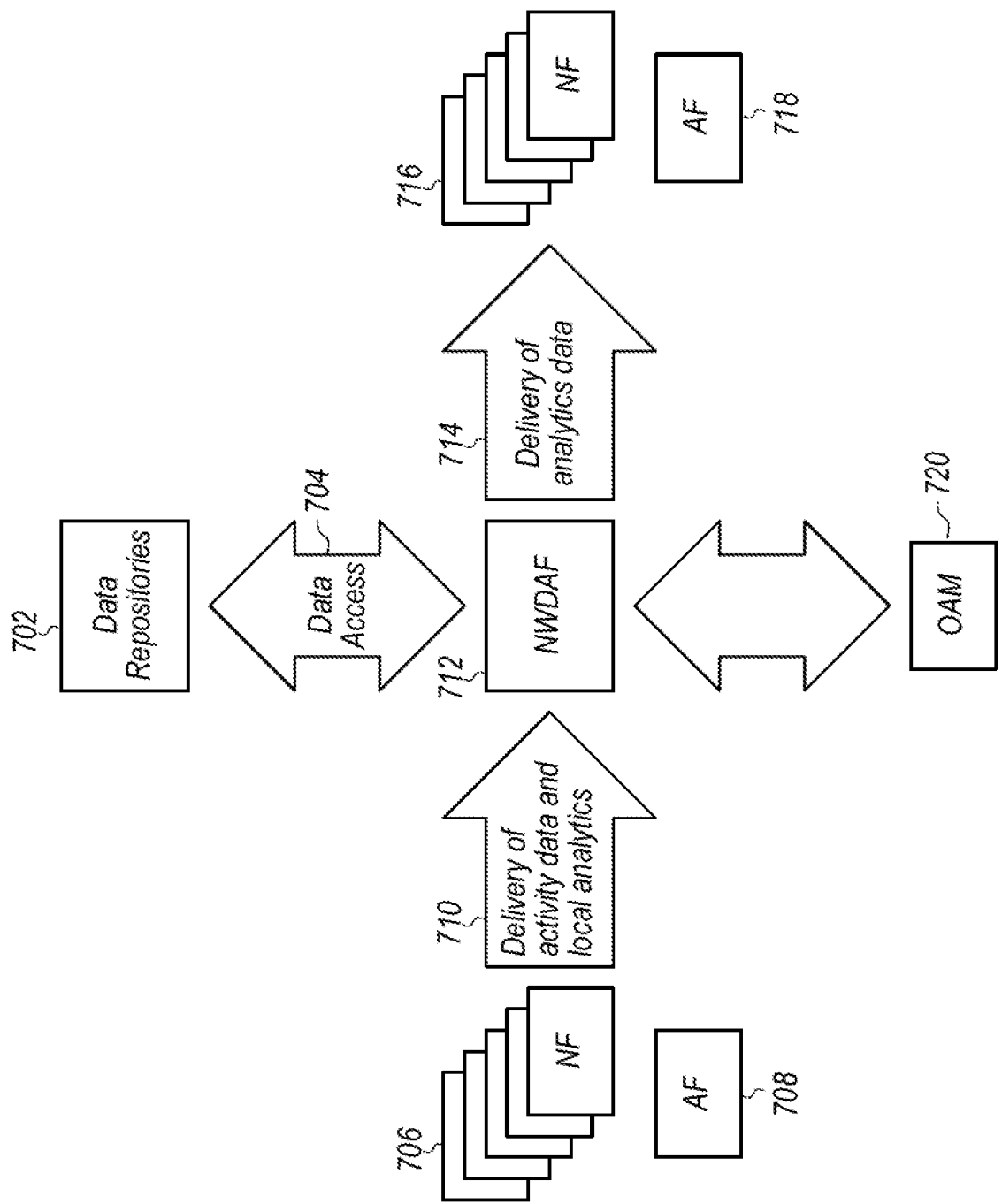
FIG. 7 illustrates an example network data analytics framework, according to some embodiments.

FIG. 7—Network Data Analytics Function Framework

FIG. 7 is a block diagram which illustrates a general framework and flow diagram for the Network Data Analytics Function (NWDAF), according to some embodiments.

As shown, the NWDAF may receive data and/or information, including user equipment (UE) mobility information, edge application server (EAS) information, application information, and/or traffic usage reports from various different network elements, such as Application Functions (AFs), access and mobility functions (AMFs), session management functions (SMFs), user plane functions (UPFs), and/or other types of Network Functions (NFs). The data or information may include various information related to the network operation, such as network load of one or more slices, wireless channel quality, configuration and fault indications, EAS capability and load information, and subscriber profiles, among other possible information. The collected information may also include UE mobility information. The UE mobility information may be provided by one or more Network Functions (NFs). In particular, the NWDAF may receive or collect UE mobility information from one or more of the AMF, PCF, UCMF, or other Network Functions. Examples of UE mobility information are provided in various use cases below. The NWDAF may also access the network operator Operation, Administration, and Maintenance (OAM) function of the network to obtain information regarding the network, such as an EAS traffic usage report. Alternatively or additionally, one or more types of data or information may be accessed by the NWDAF from one or more data repositories.

The NWDAF described herein is capable of supporting UE capability data analytics and hence may be able to collect group UE capability information, such as from the UCMF. The group UE capability information refers to capability information from a group of UEs, wherein the UEs in the group have the same or similar characteristics. The detailed information collected by the NWDAF may include capability information data from the UCMF, which is an example of network data from the core network (e.g., the 5GC).

The NWDAF may perform data analytics on the information received, and may deliver the analytics data to one or more of the aforementioned types of NFs. The delivered analytics data may be used by the NFs to inform and/or direct network operation and/or resource allocation for edge computing by the NFs.

Multi-Access Edge Computing

Modern cellular phones are being asked to perform increasingly complex applications. In general, users prefer the use of smartphones (UEs) due to their portability and ease of use. However, being portable or mobile devices, UEs such as smartphones are battery-powered and have a small size relative to non-portable devices such as desktop computers. Thus, UE devices have various hardware limitations, such as battery life, power, processing ability and memory capacity. In order to reduce the load of applications running on UE devices, and also to provide for more efficient use of UE resources, efforts have been made to offload the computational requirements of the UE to another computing resource. The term "Mobile Cloud Computing" (MCC) refers to the use of cloud servers to perform computational tasks that may otherwise be performed by a UE. However, as described above, the use of cloud servers that are physically remotely located from the UEs they are attempting to assist (the UEs from which they are attempting to offload tasks) may introduce communication delays that make such cloud servers unsuitable for real time applications.

Multi-access Edge Computing (MEC) (also called Mobile Edge Computing) provides an information technology (IT) service environment and cloud computing capabilities at the edge of the mobile network, within the Radio Access Network (RAN) and in close physical proximity to mobile subscribers. In other words, MEC operates to locate mobile cloud computing (MCC) services closer to mobile users (closer to the "edge" of the network) to reduce communication delays. Specific user requests may thus be managed directly at the network edge, instead of forwarding all traffic to remote Internet services. MEC promises significant reduction in latency and mobile energy consumption while delivering highly reliable and sophisticated services.

In a MEC system, a processing task from a UE may be offloaded to a nearby MEC host (e.g., one or more MEC servers) via the cellular network. The MEC host may perform the data gathering, processing and returning of the results of computationally intensive tasks, and as such can cover a broad spectrum of use cases and applications. The MEC host may then return the resultant data from the processing task back to the application running on the UE.

Two key MEC operational phases may be referred to as the control phase (control plane) and the operation phase (data plane). The control phase (control plane) may include the auxiliary procedures for initiation, connection, maintenance and termination of MEC operation. The control plane decides what, when, where, and how to offload tasks correctly to the MEC servers. The operation phase (data plane) handles the routing of data to/from the edge cloud.

Embodiments described herein utilize a NWDAF to provide data analytics for MEC applications. Embodiments are described herein in the context of cellular systems (e.g., 3GPP-based systems). However, the embodiments described herein may be readily extended to non-cellular (non-3GPP-based) systems.

User-Plane Optimization for Edge Computing

Edge computing locates computational resources physically proximate to UE devices to provide low latency and high data volume. In order to support the large quantity of services and/or applications operating in edge computing efficiently, it may be desirable for the 5G Core Network (5GC) to analyze data related to edge computing deployment and hosted application/service characteristics. In this context, it may be desirable to analyze data related to 1) characteristics of applications served by EASs (as used herein, the term "edge application" will be used to refer to any application that is being served by one or more EASs), 2) UE mobility and application mobility, 3) the characteristics and performance of data sessions between the user plane function (UPF) and edge computing servers, and 4) edge computing infrastructure deployment.

Embodiments herein address these and other concerns by utilizing a NWDAF to derive data analytics from characteristics and behaviour of deployed EASs in the network infrastructure. These analytics may assist the operator/carrier in making informed decisions for improving EAS deployment and edge computing resource relocation.

FIGS. 8-11—Communication Diagrams for NWDAF Data Analytics for Edge Computing

Figure 8:
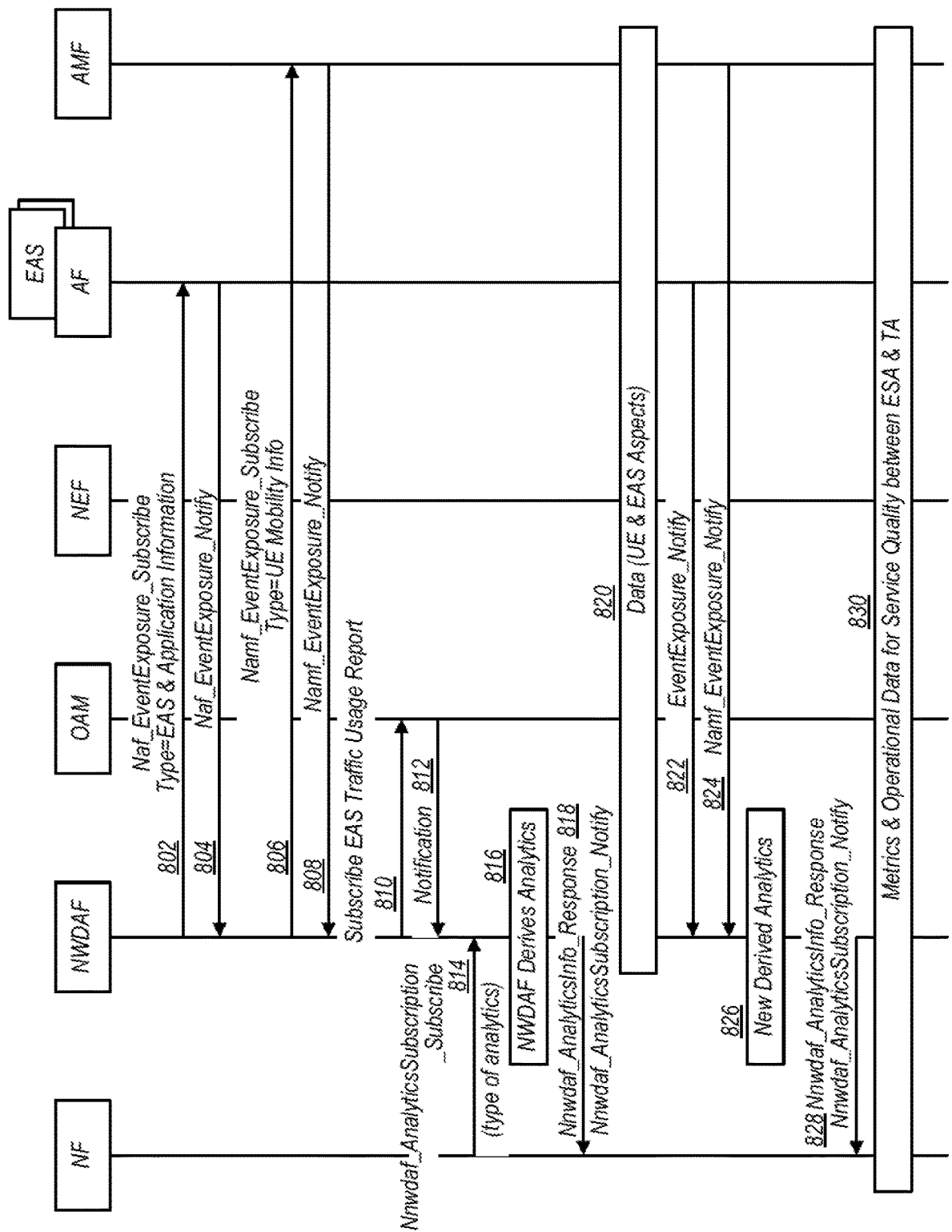
FIG. 8 is a communication flow diagram illustrating a procedure for a NWDAF to perform subscription analytics while gathering information from an application function (AF), according to some embodiments.

FIGS. 8-11 are communication flow diagrams for utilizing a NWDAF for data analytics in an MEC environment, according to various embodiments. FIG. 8 is a communication flow diagram illustrating a procedure for a NWDAF to perform subscription analytics while gathering information from an application function (AF), according to some embodiments.

At 802, the NWDAF sends a message to the AF to subscribe to EAS and application information. The message sent to the AF may be a NAF_EventExposure_Subscribe message with a "EAS & Application Information" type designation, as one example.

At 804, the AF may respond to the NWDAF by sending the EAS and application information. The AF may respond using a NAF_EventExposure_Notify message, as one possibility. The EAS and application information is discussed in greater detail below in reference to the tables illustrated in FIGS. 14 and 15.

At 806, the NWDAF sends a message to the Access and Mobility Function (AMF) to subscribe to UE mobility information. The message sent to the AMF may be a NAMF_EventExposure_Subscribe message with a "UE Mobility Information" type designation, as one example.

At 808, the AMF may respond to the NWDAF by sending the UE mobility information. The AMF may respond using a NAF_EventExposure_Notify message, as one possibility. The UE mobility information is discussed in greater detail below in reference to the table illustrated in FIG. 13.

At 810, the NWDAF sends a subscribe message to the Operation, Administration, and Management (OAM) function to subscribe to EAS traffic usage reports.

At 812, the OAM function may respond to the NWDAF by sending a notification including the EAS traffic usage report.

At 814, a NF sends a data analytics subscription request to the NWDAF. The request sent to the NWDAF may be a Nnwdaf_AnalyticsSubscription_Subscribe message, as one example, and may specify the type(s) of data analytics requested, such as UE mobility information and/or UE group ID information related to EAS deployment, as explained in greater detail below. The NF may be an of a variety of types of NFs, including but not limited to a policy control function (PCF) or a session management function (SMF).

In some embodiments, multiple retransmissions may occur at the UPF for a packet data unit (PDU) session related to a deep neural network (DNN) or other type of edge computing session. When this occurs, the UPF may notify the SMF to modify the PDU session (e.g., to reduce the likelihood of further retransmissions). The SMF may in turn ping the PCF to provide the policy for a new EAS deployment. In these embodiments, the PCF may serve as the NF in FIG. 8, and may receive data analytics from the NWDAF to determine desirable and/or available EAS resources to reallocate for the PDU session. Alternatively, in other embodiments, the SMF may serve as the NF in FIG. 8, and the SMF may receive data analytics from the NWADF directly to determine EAS resource reallocation for the PDU session.

At 816, the NWDAF derives analytics and at 818 responds to the NFs with the requested data analytics. The NWDAF may respond using a Nnwdaf_AnalyticsInfo_Response message including the requested data analytics. The NWDAF may also respond with a Nnwdaf_AnalyticsSubscription_Notify message to inform the NF that it has been successfully subscribed to periodically receive data analytics and/or share analytics information. As described in greater detail below in reference to FIGS. 17-18, the data analytics may include congestion information, downtime or operational issues with EAS operation, application handling with UE mobility, and/or predictions to mitigate negative impacts on EAS sessions, among other possibilities.

At 820, the NWDAF may continue communicating with the OAM, AF, and/or the AMF to receive updated information. The NWDAF may periodically receive updated data analytic information. Alternatively, the NWDAF may receive updated information in response to event triggers. For example, at 822, the AF may transmit an EventExposure_Notify message to the NWDAF in response to EAS congestion to inform the NWDAF of the EAS congestion, among other possibilities. At 824 the AMF may transmit a Namf_EventExposure_Notify message to the NWDAF in response to one or more UEs changing their serving area, or in response to other changes in the UE mobility information. At 826, the NWDAF may derive new data analytics based on the updated information At 828, the NWDAF may send updated data analytics to the subscribed NF. The NWDAF may send the updated data analytics to the NF periodically with a predetermined period, or the NWDAF may send the updated data analytics in response to receiving updated information from one or more of the OAM function, the AF, and/or the AMF.

At 830, the data analytics provided to the NF may be utilized to improve service quality of the ESA and/or the TA for one or more UEs.

Figure 9:
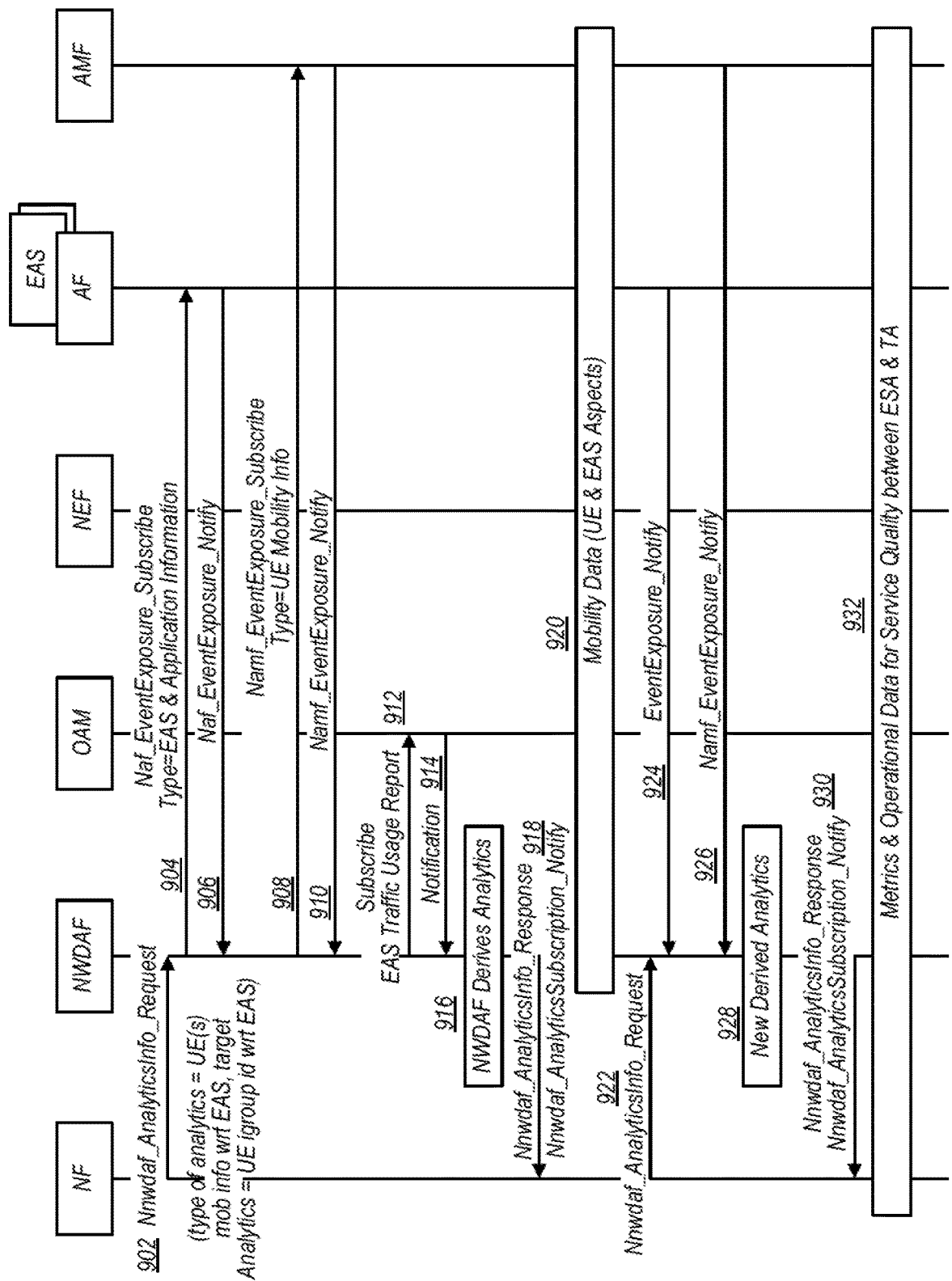
FIG. 9 is a communication flow diagram illustrating a procedure for a NWDAF to perform on-demand analytics while gathering information from an AF, according to some embodiments.

FIG. 9 is a communication flow diagram illustrating a procedure for a NWDAF to perform on-demand analytics while gathering information from an AF, according to some embodiments. The communication flow illustrated in FIG. 9 is similar in some aspects to that shown in FIG. 8, except that the NWDAF data analytics are transmitted to the NF on an "on-demand" basis rather than as a subscription service.

Similarly to FIG. 8, the NF may be of a variety of types of NFs, including a PCF or an SMF. For example, in some embodiments, multiple retransmissions may occur at the UPF for a packet data unit (PDU) session related to a deep neural network (DNN) or other type of edge computing session. When this occurs, the UPF may notify the SMF to modify the PDU session (e.g., to reduce the likelihood of further retransmissions). The SMF may in turn ping the PCF to provide the policy for a new EAS deployment. In these embodiments, the PCF may serve as the NF in FIG. 9, and may receive data analytics from the NWDAF to determine desirable and/or available EAS resources to reallocate for the PDU session. Alternatively, in other embodiments, the SMF may serve as the NF in FIG. 9, and the SMF may receive data analytics from the NWADF directly to determine EAS resource reallocation for the PDU session.

At 902, a NF sends an analytics information request message to the NWDAF for data analytics information. The request message may be a Nnwdaf_AnalyticsInfo_Request message, and may include a field to specify the type(s) of analytics requested (e.g., it may request UE mobility information and/or a UE group ID with respect to an EAS).

At 904, the NWDAF sends a message to the AF to subscribe to EAS and application information. The message sent to the AF may be a Naf_EventExposure_Subscribe message with a "EAS & Application Information" type designation, as one example.

At 906, the AF may respond to the NWDAF by sending the EAS and application information. The AF may respond using a Naf_EventExposure_Notify message, as one possibility. The EAS and application information is discussed in greater detail below in reference to the tables illustrated in FIGS. 14 and 15.

At 908, the NWDAF sends a message to the Access and Mobility Function (AMF) to subscribe to UE mobility information. The message sent to the AMF may be a Namf_EventExposure_Subscribe message with a "UE Mobility Information" type designation, as one example.

At 910, the AMF may respond to the NWDAF by sending the UE mobility information. The AMF may respond using a Naf_EventExposure_Notify message, as one possibility. The UE mobility information is discussed in greater detail below in reference to the table illustrated in FIG. 13.

At 912, the NWDAF sends a subscribe message to the Operation, Administration, and Management (OAM) function to subscribe to EAS traffic usage reports.

At 914, the OAM function may respond to the NWDAF by sending a notification including the EAS traffic usage report.

At 916, the NWDAF derives analytics and at 918 responds to the NFs with the requested data analytics. The NWDAF may respond using a Nnwdaf_AnalyticsInfo_Response message including the requested data analytics. The NWDAF may also respond with a Nnwdaf_AnalyticsSubscription_Notify message to inform the NF that it has been successfully subscribed to periodically receive data analytics. As described in greater detail below in reference to FIGS. 17-18, the data analytics may include congestion information, downtime or operational issues with EAS operation, and/or application handling with UE mobility, among other possibilities.

At 920, the NWDAF may continue communicating with the OAM, AF, and/or the AMF to receive updated information. The NWDAF may periodically receive updated data analytic information. Alternatively, the NWDAF may receive updated information in response to event triggers. For example, at 924, the AF may transmit an EventExposure_Notify message to the NWDAF in response to EAS congestion to inform the NWDAF of the EAS congestion, among other possibilities. At 926 the AMF may transmit a Namf_EventExposure_Notify message to the NWDAF in response to one or more UEs changing their serving area, or in response to other changes in the UE mobility information. Alternatively, the NWDAF may request updated information in response to receiving a second request for data analytics from the NF at step 922. At 928, the NWDAF may derive new data analytics based on the updated information At 930, the NWDAF may send updated data analytics to the subscribed NF. The NWDAF may send the updated data analytics to the NF periodically with a predetermined period, or the NWDAF may send the updated data analytics in response to receiving updated information from one or more of the OAM function, the AF, and/or the AMF.

At 932, the data analytics provided to the NF may be utilized to improve service quality of the ESA and/or the TA for one or more UEs.

Figure 10:
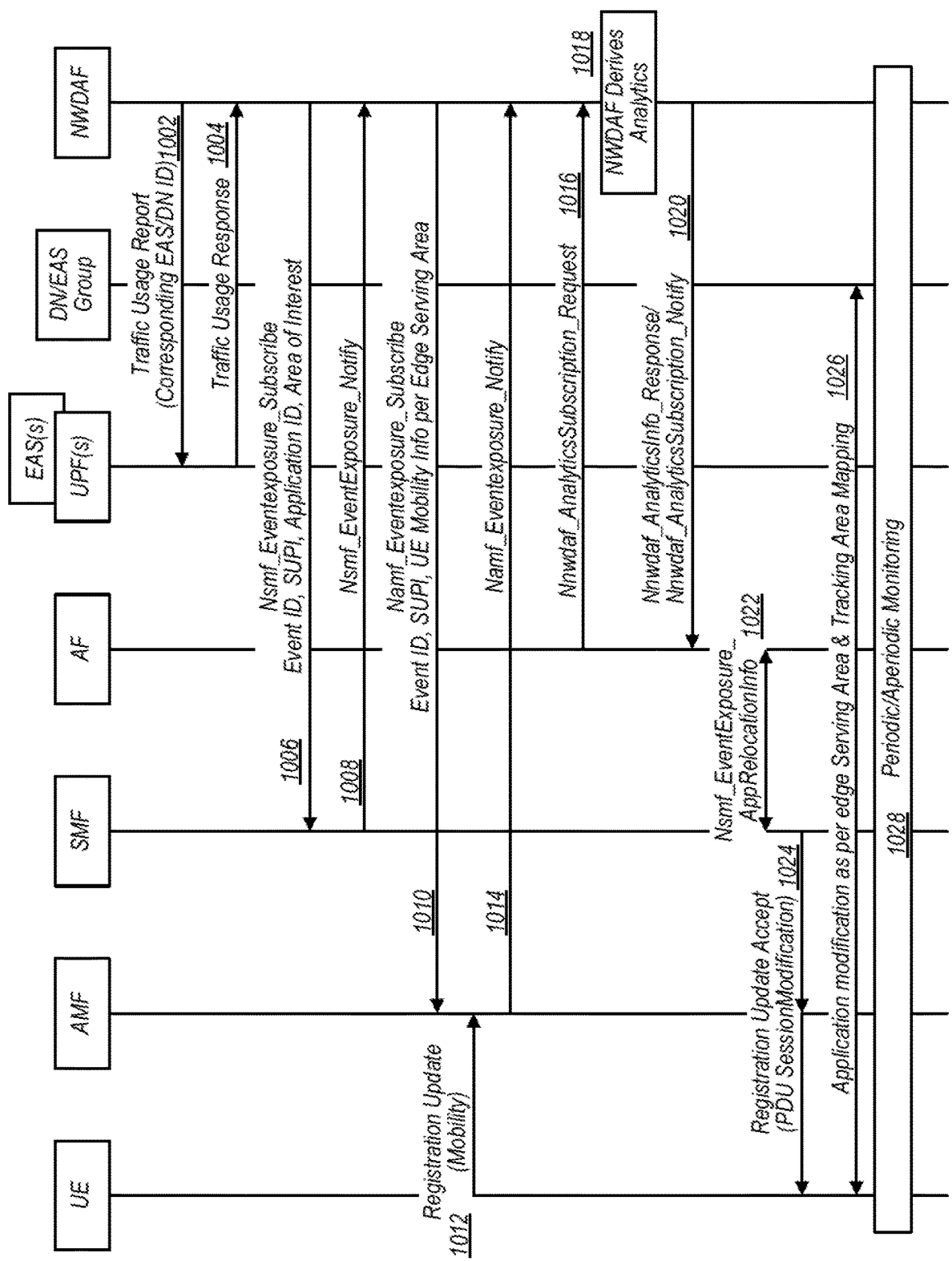
FIG. 10 is a communication flow diagram illustrating a procedure for a NWDAF to perform subscription analytics while gathering information from a user plane function (UPF), according to some embodiments.

FIG. 10 is a communication flow diagram illustrating a procedure for a NWDAF to perform subscription analytics while gathering information from a user plane function (UPF), according to some embodiments. FIG. 10 is similar in some aspects to the communication flow diagram shown in FIG. 8, except that the NWDAF requests and receives EAS and application information from the user plane function (UPF), rather than from the AF.

At 1002, the NWDAF sends a message to the UPF to request a Traffic Usage Report corresponding to a particular EAS and/or data network (DN) identifier (ID).

At 1004, the UPF may respond to the NWDAF by sending a Traffic Usage Response. The Traffic Usage Response may include a variety of types of information corresponding to the EAS/DN ID, as discussed in greater detail below in reference to the table illustrated in FIG. 16. The UPF may transmit more detailed information than the AF, in some embodiments.

At 1006, the NWDAF sends a message to the SMF to subscribe to information related to a particular application ID and area of interest. The message to the SMF may be a Nsmf_EventExposure_Subscribe message, and may specify an event ID, a subscription permanent identifier (SUPI), an application ID, and/or an area of interest.

At 1008, the SMF responds to the NWDAF with the requested information. The response of the SMF may be a Nsmf_EventExposure_Notify message.

At 1010, the NWDAF sends a message to the Access and Mobility Function (AMF) to subscribe to UE mobility information. The message sent to the AMF may be a Namf_EventExposure_Subscribe message with a "UE Mobility Information for EAS Serving Area" type designation, as one example.

At 1012, a UE may send a registration update to the AMF that includes mobility information of the UE. While FIG. 10 illustrates a single UE sending a registration update, a plurality of UEs may send respective registration updates to the AMF.

At 1014, the AMF may respond to the NWDAF by sending the requested information. The AMF may respond using a Naf_EventExposure_Notify message, as one possibility. The information sent by the AMF to the NWDAF may include UE mobility and location information, as well as tracking area information. The UE mobility information is discussed in greater detail below in reference to the table illustrated in FIG. 13.

Figure 12:
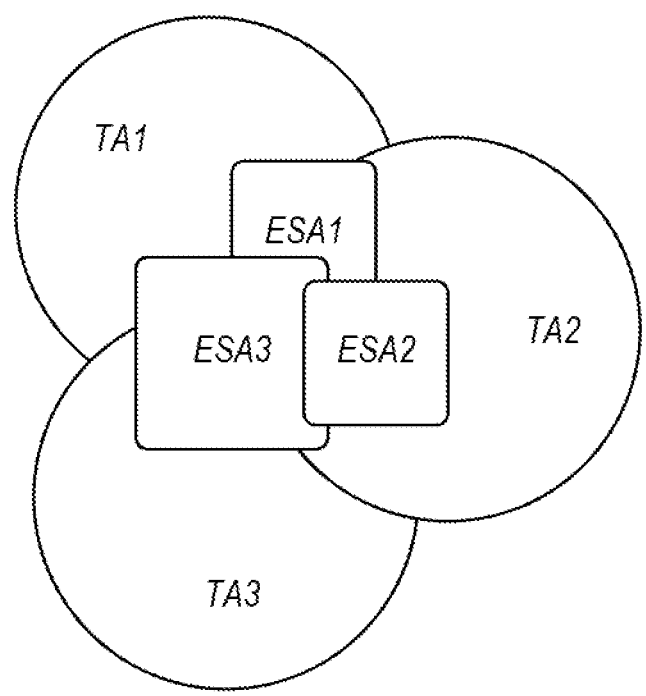
FIG. 12 is an example geographic illustration of three tracking areas and three edge application server (EAS) service areas (ESA), according to some embodiments.

At 1016, an AF sends a data analytics subscription request to the NWDAF. The request sent to the NWDAF may be a Nnwdaf_AnalyticsSubscription_Request message, as one example, and may specify the type(s) of data analytics requested, such as UE mobility information and/or UE group ID information related to EAS deployment, as explained in greater detail below. The AF may further request information related to a mapping of EAS Serving Areas (ESAs) to tracking areas (TAs). For example, as illustrated in FIG. 12, there may exist a geographical mapping between ESAs 1, 2, and 3 and TAs 1, 2, and 3, as one example, and the AF may utilize this mapping to appropriate allocate EAS resources among different TAs.

At 1018, the NWDAF derives analytics and at 1020 responds to the AF with the requested data analytics. The NWDAF may respond using a Nnwdaf_AnalyticsInfo_Response message including the requested data analytics. The NWDAF may also respond with a Nnwdaf_AnalyticsSubscription_Notify message to inform the NF that it has been successfully subscribed to periodically receive data analytics. As described in greater detail below in reference to FIGS. 17-18, the data analytics may include congestion information, downtime or operational issues with EAS operation, and/or application handling with UE mobility, among other possibilities. The transmitted data analytics may include a recommendation of whether relocation of edge computing resources is required, as one example.

At 1022, the AF may analyze the received data analytics and determine what information is useful and/or relevant to transmit to the SMF. For example, the AF may determine whether the data analytics suggests that the SMF should relocate EAS resources for one or more applications directed by the SMF. The AF may then transmit the relevant information to the SMF, e.g., through a Nsmf_EventExposure message including an AppRelocationInfo field to specify how one or more applications should be relocated in the EAS environment.

At 1024, the SMF may transmit a Registration Update Accept (PDU SessionModification) message to the UE through the AMF to modify the PDU session (e.g., to update tracking area registration).

At 1026, the UE may communicate with the EAS group to modify the allocation of EAS resources for the application according to the ESA and TA mapping.

Finally, at 1028, the NFs illustrated in FIG. 10 may periodically or aperiodically monitor data analytics information to appropriately maintain and update EAS resource allocation and tracking area mapping, as appropriate.

Figure 11:
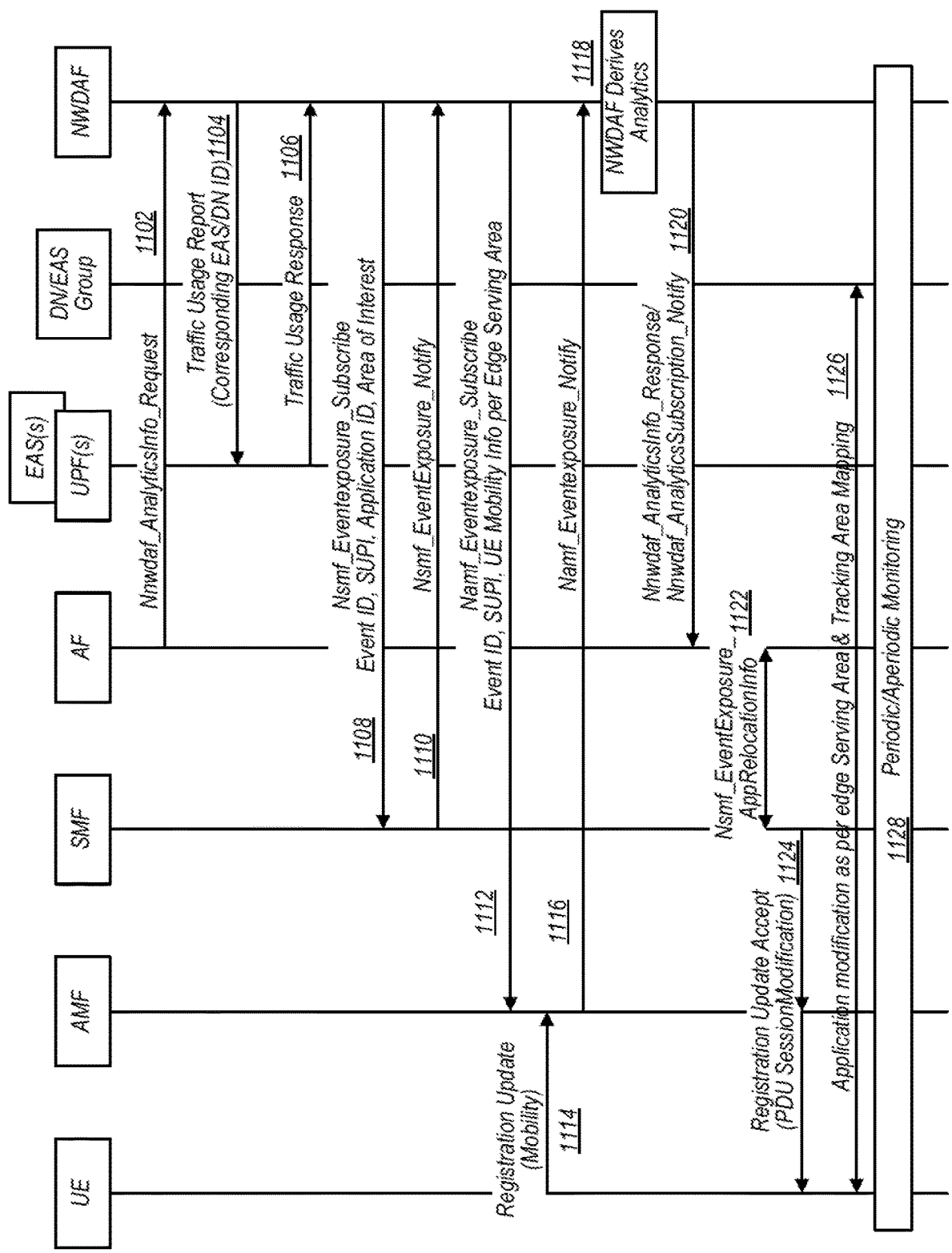
FIG. 11 is a communication flow diagram illustrating a procedure for a NWDAF to perform on-demand analytics while gathering information from a UPF, according to some embodiments.

FIG. 11 is a communication flow diagram illustrating a procedure for a NWDAF to perform on-demand analytics while gathering information from a UPF, according to some embodiments. FIG. 11 is similar in some aspects to the communication flow diagram shown in FIG. 10, except that the NWDAF data analytics are transmitted to the NF on an "on-demand" basis rather than as a subscription service.

At 1102, an AF sends a data analytics request message to the NWDAF. The request sent to the NWDAF may be a Nnwdaf_AnalyticsInfo_Request message, as one example, and may specify the type(s) of data analytics requested, such as UE mobility information and/or UE group ID information related to EAS deployment, as explained in greater detail below. The AF may further request information related to a mapping of EAS Serving Areas (ESAs) to tracking areas (TAs). For example, as illustrated in FIG. 12, there may exist a geographical mapping between ESAs 1, 2, and 3 and TAs 1, 2, and 3, as one example, and the AF may utilize this mapping to appropriate allocate EAS resources among different TAs.

At 1104, in response to receiving the data analytics request message, the NWDAF sends a message to the UPF to request a Traffic Usage Report corresponding to a particular EAS and/or data network (DN) identifier (ID).

At 1106, the UPF may respond to the NWDAF by sending a Traffic Usage Response. The Traffic Usage Response may include a variety of types of information corresponding to the EAS/DN ID, as discussed in greater detail below in reference to the table illustrated in FIG. 16. The UPF may transmit more detailed information than the AF, in some embodiments.

At 1108, the NWDAF sends a message to the SMF to subscribe to information related to a particular application ID and area of interest. The message to the SMF may be a Nsmf_EventExposure_Subscribe message, and may specify an event ID, a SUPI, an application ID, and/or an area of interest.

At 1110, the SMF responds to the NWDAF with the requested information. The response of the SMF may be a Nsmf_EventExposure_Notify message.

At 1112, the NWDAF sends a message to the Access and Mobility Function (AMF) to subscribe to UE mobility information. The message sent to the AMF may be a Namf_EventExposure_Subscribe message with a "UE Mobility Information for EAS Serving Area" type designation, as one example.

At 1114, a UE may send a registration update to the AMF that includes mobility information of the UE. While FIG. 10 illustrates a single UE sending a registration update, a plurality of UEs may send respective registration updates to the AMF.

At 1116, the AMF may respond to the NWDAF by sending the requested information. The AMF may respond using a Namf_EventExposure_Notify message, as one possibility. The information sent by the AMF to the NWDAF may include UE mobility and location information, as well as tracking area information. The UE mobility information is discussed in greater detail below in reference to the table illustrated in FIG. 13.

At 1118, the NWDAF derives analytics and at 1120 responds to the AF with the requested data analytics. The NWDAF may respond using a Nnwdaf_AnalyticsInfo_Response message including the requested data analytics. The NWDAF may also respond with a Nnwdaf_AnalyticsSubscription_Notify message to inform the NF that it has been successfully subscribed to periodically receive data analytics. As described in greater detail below in reference to FIGS. 17-18, the data analytics may include congestion information, downtime or operational issues with EAS operation, and/or application handling with UE mobility, among other possibilities. The transmitted data analytics may include a recommendation of whether relocation of edge computing resources is required, as one example.

At 1122, the AF may analyze the received data analytics and determine what information is useful and/or relevant to transmit to the SMF. For example, the AF may determine whether the data analytics suggests that the SMF should relocate EAS resources for one or more applications directed by the SMF. The AF may then transmit the relevant information to the SMF, e.g., through a Nsmf_EventExposure message including an AppRelocationInfo field to specify how one or more applications should be relocated in the EAS environment.

At 1124, the SMF may transmit a Registration Update Accept (PDU SessionModification) message to the UE through the AMF to modify the PDU session (e.g., to update tracking area registration).

At 1126, the UE may communicate with the EAS group to modify the allocation of EAS resources for the application according to the ESA and TA mapping.

Finally, at 1128, the NFs illustrated in FIG. 11 may periodically or aperiodically monitor data analytics information to appropriately maintain and update EAS resource allocation and tracking area mapping, as appropriate.

FIGS. 13-16—Tables for NWDAF Data Analytics Input

FIG. 13-16 are tables that tabulate a variety of types of information that may be received by the NWADF from other NFs to derive data analytics. For example, FIG. 13 tabulates potential types of information collected from an AMF related to UE mobility. As illustrated, the AMF may transmit information to the NWADF related to a group ID of a group of UEs serviced by the AMF, geographical locations of a plurality of UEs, which may include one or both of tracking areas or served cells of the UEs and a time stamp of when the AMF detects that the UE enters a particular location. The AMF may also transmit information indicating a type allocation code (TAC) that indicates the terminal model and vendor information of a UE.

In some embodiments, the AMF further transmits frequent mobility reregistration information to the NWADF. The frequent mobility reregistration information may identify one or more UEs that have frequently reselected between different neighbor cells due to radio coverage fluctuations. This may lead to multiple re-registrations if the cells belong to different registration areas. The number of re-registrations N within a period M may be an indication for abnormal ping-pong behaviour, where N and M are configurable parameters of the network operator.

FIG. 14 tabulates different types of information related to an edge computing application that may be received by the NWADF from the AF. As illustrated, this information may include a UE ID (e.g., a Generic Public Subscription Identifier (GPSI) an external UE ID, or another type of UE ID), one or more application IDs that identify one or more respective edge computing applications providing a service through the EAS(s), and/or a trajectory of application users to predict edge relocations (e.g., this may include UE location and/or time stamps for when a UE enters an ESA).

In some embodiments, the application information may further include a UE Group Application Session ID, which indicates a group application ID of a group of UEs served by a particular EAS.

FIG. 15 tabulates different types of EAS statistics that may be received by the NWADF from the AF. As illustrated, this information may include a list of resource statuses associated with the serving EASs, such as EAS type, EAS instance ID, EAS status, EAS resource usage, EAS load, and/or EAS peak load.

In some embodiments, the EAS statistics may further include EAS measurements of the round-trip-time (RTT) of data communications between UEs and the EASs or other information related to measurements, as well as EAS capability information specifying processor, GPU, and/or memory capabilities of the EAS(s).

FIG. 16 tabulates different types of information related to an edge computing application that may be received by the NWADF from the UPF. The information received from the UPF may contain some of the same types of information as that contained in FIG. 14, such as a UE ID, one or more application IDs that identify one or more respective edge computing applications providing a service through the EAS(s), a trajectory of application users to predict edge relocations, and/or a UE Group Application Session ID which indicates a group application ID of a group of UEs served by a particular EAS. However, the edge application information from the UPF may additionally contain a quality of service (QoS) flow bit rate for both UL and DL, a QoS flow packet delay for both UL and DL, a number of packet transmissions, and/or a number of packet retransmissions for the edge application.

FIGS. 17-18—NWDAF Output Data Analytics

Embodiments herein describe methods and computer systems for a NWDAF to support assistance for Edge computing by collecting information from various other NFs in the core network (e.g., AMF, AF, UPF, etc.), and performing big data analytics to provide characteristics and behaviour of the EAS server to other NFs in the network. The receiver of the data analytics of the NWDAF may indicate one or more specifications in its request for the data analytics, including the target of analytics reporting (e.g., a single EAS identifier or group identifier of a group of EASs), an analytics target period indicating the time period over which the statistics are requested, and/or a preferred level of accuracy of the analytics (e.g., low, medium, or high). The NF receiving the data analytics may further request analytics filter information containing an optional list of parameters such as "UE Information Collected from AMF related to mobility", "UE Information Collected from AF related to Edge Application", "EAS Information collected from AF", and/or a maximum number of results, as described in greater detail in reference to the Tables in FIGS. 17-18.

FIG. 17 is a table illustrating different types of information that may be present in the data analytics reported by the NWADF to other NFs in the core network. As illustrated, the NWADF may report resource update information that provides a list of information for one or more EAS instances, along with the corresponding EAS ID and/or EAS Set ID with respect to UE groups served for each of one or more edge applications. The list may include a specification of EAS resource relocations, EAS load distribution, EAS tracking area code mapping, and/or EAS applications' state. For example, the EAS resource relocation may specify relocations of assigned resources (e.g., CPU, memory, and/or disk resources) for EAS applications to respective UE groups. The EAS load distribution may specify the average load of the EAS instance over the analytics target period for different application aspects. The EAS tracking area code mapping may specify mapping of the EAS area against the mobility area(s) of the UE(s). The EAS Applications' state may specify the state of applications running on different EAS(s) with respect to UE groups. The NWADF may further report on the confidence of each reported piece of information.

FIG. 18 is a table illustrating example predictive data analytics computed by a NWDAF, according to some embodiments. In some embodiments, in addition to or alternatively to reporting information related to the current status of the EAS operations, the NWADF may report information related to predictions of future resource and operational states. For example, the NWADF may report a resource update including a list of predicted information for each EAS instance along with the corresponding EAS ID and/or EAS Set ID with respect to UE groups served for each edge application. The list may include a prediction of future EAS resource management, UE group mobility, application state, and/or application load. The NWADF may also report a confidence level for the predictions. The EAS resource management information may specify, based upon an analytics model, a prediction for whether it will be desirable for resources for a particular EAS instance to be increased or reduced. The UE Group mobility information may predict UE group mobility for one or more UE groups based on subscription data modeling and/or congestion period predictions. The application state and/or application load prediction may predict a future application state and/or load of one or more applications served by an EAS on the basis of time of usage and number of users at a particular EAS instance. For example, the data analytics may determine that a particular application used for work is not used on the weekend, and may predict that EAS resources may be deallocated from this application during the weekend. Finally, the confidence information may present a confidence level for each of the predictions communicated by the NWADF.

Figure 19:
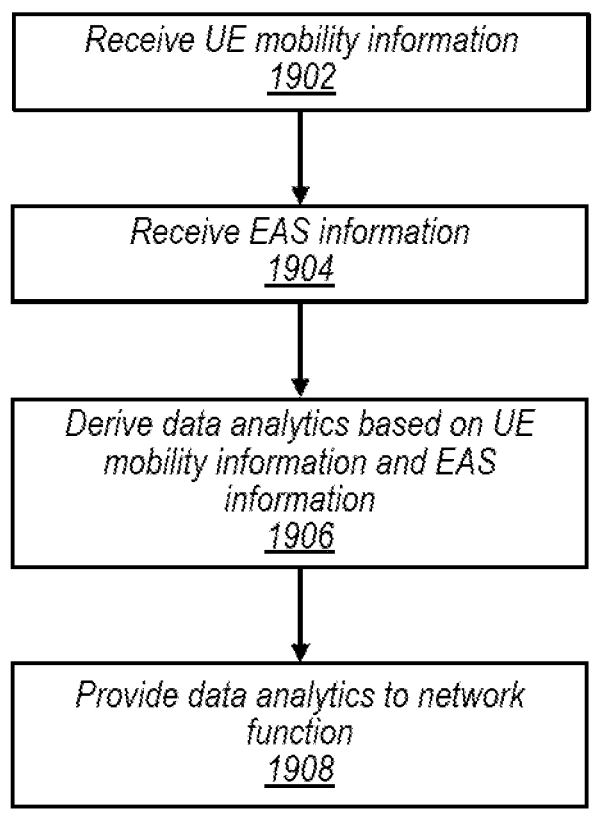
FIG. 19 is a flowchart diagram illustrating a method for a NWDAF to perform data analytics, according to some embodiments.

FIG. 19—Flowchart for Data Analytics with NWDAF

FIG. 19 is a flowchart diagram illustrating a method for a NWDAF to perform data analytics, according to some embodiments. The method shown in FIG. 19 may be used in conjunction with any of the computer systems or devices shown in the above Figures, among other devices. As one possibility, the method of FIG. 19 may be implemented by a network function (NF) or a computer system (CS) 500 such as a NWADF, such as that illustrated in and described with respect to FIGS. 3 and 6. The NWADF may include a network port, a non-transitory computer-readable memory medium, and a processor operably coupled to the memory medium, among other components. The processor may be configured to execute program instructions stored on the memory medium to perform the following method steps. In various embodiments, some of the elements of the method shown may be performed concurrently, in a different order than shown, or may be omitted. Additional elements may also be performed as desired. As shown, the method may operate as follows.

At 1902, user equipment (UE) mobility information is received from a first network function of the cellular network system. The UE mobility information may be frequent mobility reregistration information, that specifies a number of times that each of one or more UEs have attempted to reregister in a given period of time, as explained in greater detail above with reference to FIG. 13. The first network function may be an AMF.

At 1904, edge application server (EAS) information is received from a second network function of the cellular network system. The EAS information is described in greater detail above in reference to FIGS. 14-16, and may include information related to one or more EASs serving one or more edge applications. The EAS information may include one or more of a UE group application identifier of a UE group application served by a first EAS, one or more round-trip-time measurements for an EAS session, or computational capability information of one or more EASs, among other possibilities. In various embodiments, the second network function may be an AF or a UPF.

At 1906, data analytics are derived based at least in part on the UE mobility information and the edge application server information. In some embodiments, as described above in reference to FIG. 17, the data analytics include one or more of suggested relocations of EAS resources to respective UE groups, computational load information for one or more applications served by an EAS, mapping of an EAS area to a mobility area for one or more UEs, or state information for the one or more applications served by the EAS. In some embodiments, as described above in reference to FIG. 18, the data analytics include one or more of a prediction for whether EAS resource requirements for one or more applications served by an EAS will increase or decrease, a prediction of UE group mobility, a prediction of a future application state of the one or more applications, or a prediction of a future application load of the one or more applications.

At 1908, the data analytics are provided to a third network function of the cellular network system. The data analytics may be useable by the third network function to control allocation of EAS resources to one or more edge applications.

The data analytics may be provided in response to an on-demand request for the data analytics from the third network function, as described above in reference to FIGS. 9 and 11. For example, in some embodiments, the NWADF may receive an on-demand request from the third network function that specifies a requested type of data analytics (e.g., the third network function may request data analytics related to one or more specific EASs, one or more specific applications being served by one or more specific EASs, and/or one or more UE IDs or UE group IDs, among other possibilities). In these embodiments, the NWADF may request the UE mobility information and/or the EAS information in response to receiving the request from the third network function. In other words, in response to receiving the on-demand request, the NWADF may transmit a first request to the first network function for the UE mobility information (where the UE mobility information is received responsive to the first request) and transmit a second request to the second network function for the EAS information, (where the EAS information is received responsive to the second request).

In other embodiments, the request for data analytics from the third network function may be a subscription request, as described above in reference to FIGS. 8 and 10. The subscription request may subscribe the third network function to receive the data analytics from the NWADF in a periodic or aperiodic manner. For an aperiodic subscription, the NWADF may only provide new data analytics to the third network function when the data analytics are updated. For example, the NWADF may receive updated UE mobility information or updated EAS information and may derive updated data analytics based on the updated UE mobility information or the updated EAS information. The NWADF may then provide the updated data analytics to the third network function.

As described above, one aspect of the present technology is the gathering and use of data available from specific and legitimate sources to improve the quality of EAS services. The present disclosure contemplates that in some instances, this gathered data may include personal information data that uniquely identifies or can be used to identify a specific person. Such personal information data can include demographic data, location-based data, mobility information, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the UE mobility data may be used to provide an improved user experience when being serviced by an edge computing server.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of providing UE mobility data for edge computing data analytics, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their UE mobility data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus system which receives and provides data analytics for use in a cellular network system, the apparatus comprising:
at least one port for coupling to network functions in the cellular network system;
a memory;
a processor coupled to the memory;
wherein the apparatus is configured to:
receive user equipment (UE) mobility information from a first network function of the cellular network system;
receive edge application server (EAS) information from a second network function of the cellular network system;
derive data analytics based at least in part on the UE mobility information and the edge application server information, wherein the data analytics comprise a prediction for whether EAS resource requirements for one or more applications served by an EAS will increase or decrease;
receive a request for the data analytics from a third network function in the cellular network system; and
provide the data analytics to the third network function.

2. The apparatus of claim 1, wherein the UE mobility information comprises frequent mobility reregistration information.

3. The apparatus of claim 1, wherein the first network function comprises an AMF.

4. The apparatus of claim 1, wherein the EAS information comprises one or more of:
a UE group application identifier of a UE group application served by a first EAS;
one or more round-trip-time measurements for an EAS session; and
computational capability information of one or more EASs.

5. The apparatus of claim 1, wherein the second network function comprises an application function.

6. The apparatus of claim 1, wherein the second network function comprises a user plane function (UPF).

7. The apparatus of claim 1, wherein the request comprises a subscription request, wherein the apparatus is further configured to:
receive updated UE mobility information or updated EAS information;
derive updated data analytics based on the updated UE mobility information or the updated EAS information, and
provide the updated data analytics to the third network function.

8. The apparatus of claim 1, wherein the request comprises an on-demand request, wherein the apparatus is further configured to:
in response to receiving the on-demand request:

transmit a first request to the first network function for the UE mobility information, wherein the UE mobility information is received responsive to the first request;

transmit a second request to the second network function for the EAS information, wherein the EAS information is received responsive to the second request.

9. The apparatus of claim 1, wherein the data analytics comprise one or more of:
suggested relocations of EAS resources to respective UE groups;
computational load information for one or more applications served by an EAS;
mapping of an EAS area to a mobility area for one or more UEs; and
state information for the one or more applications served by the EAS.

10. The apparatus of claim 1, wherein the data analytics comprise one or more of:
a prediction of UE group mobility;
a prediction of a future application state of the one or more applications; and
a prediction of a future application load of the one or more applications.

11. The apparatus of claim 1, wherein the apparatus comprises a network data and analytics function (NWDAF).

12. The apparatus of claim 1, wherein the third network function comprises:
a policy control function;
a session management function; or
an application function.

13. A non-transitory computer-readable memory medium comprising program instructions that, when executed by a processor, cause a network data and analytics function (NWDAF) to:
receive user equipment (UE) mobility information from a first network function of a cellular network system;
receive edge application server (EAS) information from a second network function of the cellular network system;
derive data analytics based at least in part on the UE mobility information and the edge application server information, wherein the data analytics comprise a prediction for whether EAS resource requirements for one or more applications served by an EAS will increase or decrease;
receive a request for the data analytics from a third network function in the cellular network system; and
provide the data analytics to the third network function.

14. The non-transitory computer-readable memory medium of claim 13,
wherein the UE mobility information comprises frequent mobility reregistration information.

15. The non-transitory computer-readable memory medium of claim 13, wherein the EAS information comprises one or more of:
a UE group application identifier of a UE group application served by a first EAS;
one or more round-trip-time measurements for an EAS session; and
computational capability information of one or more EASs.

16. The non-transitory computer-readable memory medium of claim 13,
wherein the second network function comprises an application function or a user plane function (UPF).

17. The non-transitory computer-readable memory medium of claim 13, wherein the data analytics comprise one or more of:
suggested relocations of EAS resources to respective UE groups;
computational load information for one or more applications served by an EAS;
mapping of an EAS area to a mobility area for one or more UEs; and
state information for the one or more applications served by the EAS.

18. The non-transitory computer-readable memory medium of claim 13,
wherein the data analytics comprise one or more of:
a prediction of UE group mobility;
a prediction of a future application state of the one or more applications; and
a prediction of a future application load of the one or more applications.

19. A method for operating a network function, the method comprising:
receiving user equipment (UE) mobility information from a first network function of the cellular network system;
receiving edge application server (EAS) information from a second network function of the cellular network system;
deriving data analytics based at least in part on the UE mobility information and the edge application server information, wherein the data analytics comprise a prediction for whether EAS resource requirements for one or more applications served by an EAS will increase or decrease;
receiving a request for the data analytics from a third network function in the cellular network system; and
providing the data analytics to the third network function.

20. The method of claim 19, wherein the data analytics comprise one or more of:
suggested relocations of EAS resources to respective UE groups;
computational load information for one or more applications served by an EAS;
mapping of an EAS area to a mobility area for one or more UEs;
state information for the one or more applications served by the EAS;
a prediction of UE group mobility;
a prediction of a future application state of the one or more applications; and
a prediction of a future application load of the one or more applications.

* * * * *

UNITED STATES PATENT AND TRADEMARK OFFICE
CERTIFICATE OF CORRECTION

| | |
|---|---|
| PATENT NO. | : 11,765,680 B2 |
| APPLICATION NO. | : 17/219490 |
| DATED | : September 19, 2023 |
| INVENTOR(S) | : Rohit R. Matolia et al. |

It is certified that error appears in the above-identified patent and that said Letters Patent is hereby corrected as shown below:

In the Claims

Column 26, Line 13, delete "system".

Signed and Sealed this
Thirteenth Day of February, 2024

Katherine Kelly Vidal
*Director of the United States Patent and Trademark Office*